W. O. STODDARD.
PROCESS OF DESICCATING EGGS.

No. 190,640. Patented May 8, 1877.

Witnesses
Jos. B. Connolly
C. Sullivan

Inventor
William O. Stoddard
By Connolly Bros
Attorneys

UNITED STATES PATENT OFFICE.

WILLIAM O. STODDARD, OF NEW YORK, N. Y.

IMPROVEMENT IN PROCESSES OF DESICCATING EGGS.

Specification forming part of Letters Patent No. 190,640, dated May 8, 1877; application filed March 4, 1876.

*To all whom it may concern:*

Be it known that I, WILLIAM O. STODDARD, of the city of New York, in the county of New York and State of New York, have invented certain new and useful Improvements in the Desiccation of Egg, white of egg, yelk of egg, batter of egg, and analogous material; and I do hereby declare the following to be a full, clear, and exact description of the invention, such as will enable others skilled in the art to which it pertains to make and use it, reference being had to the accompanying drawings, which form part of this specification.

The best methods and results in the desiccation of eggs hitherto obtained and known to me are those set forth in the specifications of the several Letters Patent heretofore granted to me by the proper authorities of the United States, and bearing date, respectively, September 7, 1875, September 14, 1875, and October 25, 1875, since which dates I have continued both experimental and practical manufacture, as indicated therein, continuously and in large quantities.

The causes which lead to the deterioration and decomposition of eggs in the usual way, or before desiccation, are well known, and are fully set forth in the writings and publications of standard and scientific authorities. When, however, desiccation is resorted to with a view to the prevention thereby of the action of the causes of deterioration and decomposition so understood and referred to, certain new and changed relations, conditions, and causes are, or may be, produced, and such causes may be set in operation which tend to produce in the material desiccated the like or analogous result of deterioration or decomposition. And the object of my invention, herein set forth, is practically to guard against or prevent such deterioration or decomposition, while, at the same time, presenting a resulting material or product in the form and of the quality and character best adapted for preservation and subsequent use.

It is already well understood that if albumen or white of egg be slowly dried in mass, or be dried rapidly at too high a temperature, a product or material will be the result which is of inferior and not uniform character or quality. Also, that if the yelk of eggs be dried in mass, slowly or rapidly, the result will be a material or product inferior in quality, not uniform in structure, difficult of solution, and of little value for the ordinary uses of the yelk of eggs. Also, that if batter of eggs composed of the whites and yelks together be dried in mass, the result lacks uniformity and solubility. Also, that if either of these products, so obtained, be subsequently ground or pulverized, by any known process, the mealy result so obtained is of inferior quality, is slow of solution in water, and does not possess several of the important properties of the fresh shell eggs.

To meet this difficulty the idea of the desiccation of eggs in rotation or agitation under blasts of air, either heated or otherwise, has been variously applied during a long time past, both in this country and in Europe, but without proper study and knowledge of the nature and constituents of the egg, and the changes which occur therein under various conditions, and, therefore, without proper attention to many matters involved in the successful desiccation of a material so delicate in its character, properties, qualities, and structure as the egg. Consequently, all past attempts at the desiccation of eggs prior to my own experiments have not resulted in successfully producing a material capable of being preserved in different climates and of being readily and completely dissolved, and of being applied to the principal uses and purposes for which the egg may be applied before desiccation. All such efforts have attained only partial or approximate success; the fact being well known that prior to my own first experiments, inventions, and Letters Patent, the production of desiccated eggs as an article of commerce had never been fully obtained.

The natural egg contains, in varying proportions, (the precise average of which has not been ascertained,) a certain oil, hereinafter spoken of as the oil of the egg. This oil is a very important constituent of the egg. It is innocuous while in its natural condition—that is, in undisturbed combination with, or relation to, the other parts of the organism of the egg, its proportion thereto being relatively small.

When, however, this oil is set free by any process, it rapidly becomes rancid, highly offensive, and, in fact, acrid, and is a most potent and active agent in effecting the deterioration and decomposition of the other parts of the egg with which it may be brought in contact.

In any known process of the desiccation of eggs or any part thereof, such portion of the oil of the egg as may be held in suspension or emulsion in the more fluid portions of the material, and which is in general comparatively small, is inevitably and for obvious reasons set free with or without the use of heat in the process. It therefore requires to be provided for by proper subsequent treatment.

If, during the process of desiccation, the material to be desiccated is allowed to rise in temperature above a certain point, hereinafter indicated, the oil of the egg contained in the more solid parts, or which is not in suspension or emulsion, but is in more perfect combination with the other constituents of the egg, particularly that in the yelk, and so in the batter composed in the yelks and whites, is set free to a greater or less extent, according to the freshness and vitality of the eggs used, and the degree of such heat. I have also ascertained, by experiment, that the temperature at which this result follows varies at different times, and for causes or reasons which I have not yet been able to define. They apparently depend upon barometric and other conditions of the atmosphere, as well as the state of the thermometer. Such result has usually followed whenever the material has been raised above 85° of Fahrenheit. The highest temperature to which I have ever been able to subject the material without that result following was 92° of Fahrenheit; but that was under exceptional atmospheric conditions, and I consider a much lower temperature than 85°, and, if possible, than 80°, very desirable for safety, and essential to commercial success in the manufacture. Indeed, my own operations have been conducted at a temperature of not to exceed 80°.

The object of my invention is, therefore, to regulate and control the temperature of the eggs, or parts of eggs, or batter of eggs or other material during the process of desiccation, so as to prevent the development or freeing from the more solid part of such material of the oil of the egg not held in suspension or emulsion, being much the larger part of all the oil contained in the egg, and afterward to eliminate from the product derived such small portions of the oil of the egg as may have been held in suspension or emulsion, or may have been set free in the process of manufacture. The granulated or mealy product which I so obtain will then retain and protect its proper proportion of the oil of the egg, even if exposed to a much higher temperature than that above mentioned.

To obtain the object thus substantially set forth while employing for the process of desiccation a drying-blast of warm air, I employ for my rotating surface on which such desiccation is produced, a hollow cylinder, cone, frustum of a cone, or other modification thereof, or other surface which may be artificially cooled by means of ventilation or evaporation in the interior of the cylinder, cone, &c., or upon the opposite side of any modification, or upon the surface opposite to the desiccating-surface in any modification of the cylinder or cone.

Figure 1:
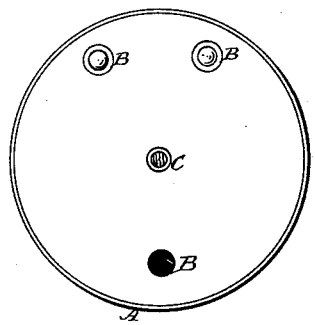
Figures 1 and 2 represent such a cylinder A, cooled artificially by ventilation forced by its own rotation through the apertures B B B, and by evaporation, if need be, of some liquid substance supplied in the cavity of the cylinder.
Figure 2:
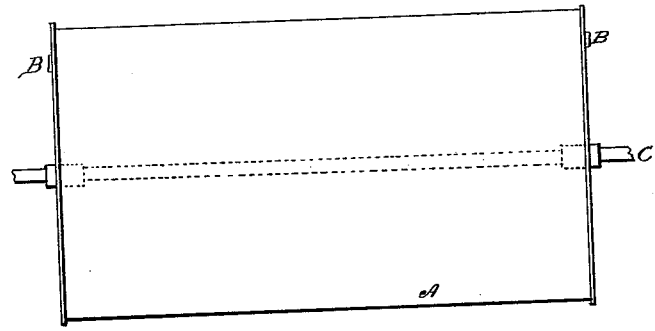
Figure 3:
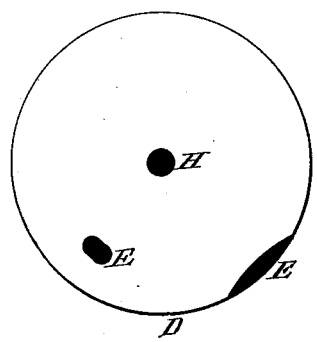
Figs. 3 and 4 represent a cone or frustum of a cone, D, similarly adapted to the purposes indicated.
Figure 4:
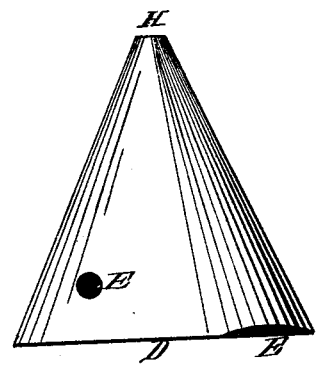
Figure 5:
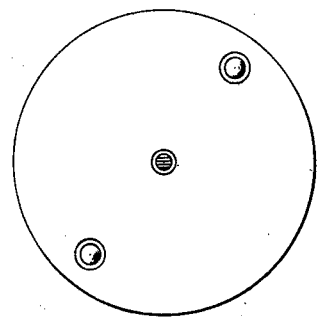
Figs. 5 and 6 represent a hollow disk, F, similarly adapted to the purposes indicated.
Figure 6:
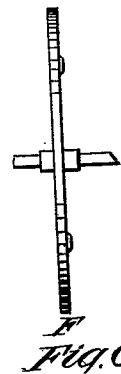

The specific mechanical appliances involved are made the subject of a separate specification and application for Letters Patent. The elimination of the part of the oil of the egg which is held in suspension or emulsion, or which may have been freed in the manner indicated, and which, in a proper method of manufacture, will be comparatively small, but which however small is, unless removed, nevertheless dangerous to the continued preservation of the product, is accomplished by active agitation of the product in aeration or ventilation. And the same should be done on or about the third day after the process of desiccation has been performed, unless the product is exposed to the air in very thin layers for a considerable time, when the same result will follow.

What I claim as my invention, and desire to secure by Letters Patent, is—

1. In the process of desiccating egg substance by means of forcible blasts or currents of air, the method of preventing deleterious chemical change in the material, consisting in the artificial production and preservation of a temperature in the desiccating apparatus below that which would set free the oil of egg not held in suspension or emulsion, substantially as described.

2. In the process of desiccating egg substance by means of forcible blasts or currents of air, the method of preventing deleterious chemical change in the material, consisting in the retention, during desiccation, of the oil of egg not held in suspension or emulsion, substantially as described.

3. In the process of desiccating egg substances in which the same is subjected to the influence of forcible currents or blasts of air without liberation of the oil of egg not held in suspension or emulsion, the method of eliminating the oil held in suspension or emulsion prior to desiccation, or set free during such process, consisting in the active agitation of the material during its aeration or ventilation, substantially as described.

4. In the process of desiccating egg substance, the method of eliminating the oil held in suspension or emulsion, or set free during the drying operation, consisting in subjecting the granular or mealy product of said drying operation to active agitation during its aeration or ventilation, substantially as described.

In testimony that I claim the foregoing I have hereunto set my hand this 2d day of February, 1876.

WILLIAM O. STODDARD.

Witnesses:
   CLARENCE F. BIRDSEYE,
   LUCIEN BIRDSEYE.